US012795545B2

(12) United States Patent
Nader et al.

(10) Patent No.: US 12,795,545 B2
(45) Date of Patent: Nov. 10, 2026

(54) METHOD AND APPARATUS FOR CONTROLLING THE USE OF PAGING EARLY INDICATION OR WAKE-UP SIGNALS

(71) Applicant: Telefonaktiebolaget LM Ericsson (PUBL), Stockholm (SE)

(72) Inventors: Ali Nader, Malmö (SE); Martin Van Der Zee, Malmö (SE); Andreas Höglund, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 282 days.

(21) Appl. No.: 18/559,633

(22) PCT Filed: May 9, 2022

(86) PCT No.: PCT/SE2022/050450
§ 371 (c)(1),
(2) Date: Nov. 8, 2023

(87) PCT Pub. No.: WO2022/240338
PCT Pub. Date: Nov. 17, 2022

(65) Prior Publication Data

US 2024/0244529 A1 Jul. 18, 2024

Related U.S. Application Data

(60) Provisional application No. 63/186,315, filed on May 10, 2021.

(51) Int. Cl.
*H04W 52/02* (2009.01)
*H04W 68/02* (2009.01)

(52) U.S. Cl.
CPC ....... *H04W 52/0235* (2013.01); *H04W 68/02* (2013.01)

(58) Field of Classification Search
CPC ............. H04W 52/0235; H04W 68/02; H04W 68/025; H04W 52/0254; H04W 76/30;
(Continued)

(56) References Cited

U.S. PATENT DOCUMENTS

2019/0007992 A1* 1/2019 Kim ...................... H04W 76/27
2021/0227466 A1* 7/2021 Kim .................... H04W 68/025
(Continued)

FOREIGN PATENT DOCUMENTS

WO WO2020165385 A1 8/2020
WO WO2021204477 A1 10/2021

OTHER PUBLICATIONS

3GPP TSG-RAN WG2 Meeting #110e (draft_R2-2005934) (Year: 2020).*
(Continued)

*Primary Examiner* — Kibrom T Hailu
(74) *Attorney, Agent, or Firm* — Baker Botts L.L.P.

(57) ABSTRACT

Methods and apparatuses for determining whether to use Paging Early Indicator (PEI) and/or Wake-Up Signal (WUS). A method performed by a network node comprises, based on a characteristic associated with a wireless device and/or a cell in which the wireless device is located, determining whether to use PEI and/or WUS for the wireless device in a last cell used by the wireless device.

15 Claims, 13 Drawing Sheets

(58) Field of Classification Search
CPC . H04W 52/0225; H04W 52/025; Y02D 30/70
See application file for complete search history.

(56) References Cited

U.S. PATENT DOCUMENTS

| | | | | |
|---|---|---|---|---|
| 2022/0264516 | A1* | 8/2022 | He | H04W 76/27 |
| 2023/0254769 | A1* | 8/2023 | Shi | H04W 68/005 370/311 |
| 2023/0379823 | A1* | 11/2023 | Berggren | H04W 52/0235 |
| 2024/0049177 | A1* | 2/2024 | Shi | H04W 52/0216 |
| 2024/0137868 | A1* | 4/2024 | Shubhi | H04W 52/0235 |

OTHER PUBLICATIONS

3GPP TS 23.401 v17.0.0 (Mar. 2021) 3rd Generation Partnership Project; Technical Specification Group Services and System Aspects; General Packet Radio Service (GPRS) enhancements for Evolved Universal Terrestrial Radio Access Network (E-UTRAN) access (Release 17).

PCT Notification of Transmittal of the International Search Report and the Written Opinion of the International Searching Authority, or the Declaration issued for International application No. PCT/SE2022/050450—Jul. 5, 2022.

3GPP TSG-RAN WG2 #105bis; Xi'An, China, Apr. 8-12, 2019; Agenda Item: 12.2.3; Source: Ericsson; Title: Mobility WUS group and paging multiplexing (Tdoc R2-1904498 (Revision of R2-1901194)).

3GPP TSG RAN WG2 #109-e; Feb. 24-Mar. 6, 2020; Agenda Item: 7.2.3, 7.1.3; Source: Qualcomm Incorporated; Title: Summary of WUS contributions to RAN2#109e (Tdoc R2-2000308).

3GPP TSG-RAN WG2 #109-e; Electronic Meeting, Feb. 24-Mar. 6, 2020; Agenda Item: 7.2.3; Source: Ericsson; Title: Group WUS (Tdoc R2-2001472 (Revision of R2-1915801)).

3GPP TSG-RAN WG2 #113 electronic; Electronic Meeting, Jan. 25-Feb. 5, 2021; Agenda Item: 8.9.2; Source: Intel Corporation; Title: [POST112-e] [064] [Pow17] Group Determination (R2-2100389).

3GPP TSG RAN meeting #91e; Electronic Meeting, Mar. 15-25, 2021; Status Report to TSG; Agenda Item: 9.7.7 UE power saving enhancements for NR [RAN2 WI: NR_UE_pow_sav_enh] (RP-210642).

3GPP TS 36.300 V16.5.0 (Mar. 2021); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).

Notice of Reasons for Rejection issued for Japanese Patent Application No. 2023-569623—Nov. 12, 2024.

3GPP TSG-RAN WG2 Meeting #108; Reno, Nevada, USA, Nov. 18-22, 2019; Agenda Item: 7.2.3; Source: Huawei, HiSilicon; Title: Discussion on SA2 reply LS on WUS assistance information (R2-1915319).

3GPP TSG RAN WG2 #111-e; Aug. 17-28, 2020; Agenda Item: 4.1, 4.2; Source: Qualcomm Incorporated; Title: Way forward on WUS usage upon RRC connection release without S1 setup/release (Tdoc R2-2007566).

3GPP TSG-RAN WG2 Meeting #113 bis electronic; Online, Apr. 12-20, 2021; Agenda Item: 8.9.2; Source: Lenovo, Motorola Mobility; Title: Consideration on Idle/inactive-mode UE power saving (R2-2103396).

3GPP TSG RAN WG1 #103-e; e-Meeting, Oct. 26-Nov. 13, 2020; Agenda Item: 8.7.1.1; Source: LG Electronics; Title: Discussion on potential paging enhancements (R1-2008053).

3GPP TSG RAN WG1 #104-bis-e; e-Meeting, Apr. 12-20, 2021; Agenda Item: 8.7.1.1; Source: Nokia, Nokia Shanghai Bell; Title: Evaluation of potential paging enhancements (R1-2103405).

3GPP TSG-RAN WG2 Meeting #112 electronic; Online, Nov. 2-13, 2020; Agenda Item: 8.9.2; Source: Lenovo, Motorola Mobility; Title: Consideration on Idle/inactive-mode UE power saving (R2-2009878).

Extended European Search Report issued for Application No. / Patent No. 22807942.2-1215 / 4338503 PCT/SE2022050450—Feb. 3, 2025.

* cited by examiner

METHOD AND APPARATUS FOR CONTROLLING THE USE OF PAGING EARLY INDICATION OR WAKE-UP SIGNALS

PRIORITY

This nonprovisional application is a U.S. National Stage Filing under 35 U.S.C. § 371 of International Patent Application Serial No. PCT/SE2022/050450 filed May 9, 2022 and entitled "Method and Apparatus for Controlling the Use of Paging Early Indication or Wake-Up Signals" which claims priority to U.S. Provisional Patent Application No. 63/186,315 filed May 10, 2021, both of which are hereby incorporated by reference in their entirety.

TECHNICAL FIELD

Embodiments of the present disclosure relate to methods, network nodes and wireless devices, and particularly methods, network nodes and wireless devices for determining whether to use Paging Early Indicator (PEI) and/or Wake-Up Signal (WUS).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

When the user equipment (UE) is in Idle or Inactive mode the UE wakes-up every discontinuous reception (DRX) cycle (e.g. 1.28 sec) to monitor its Paging Occasion (PO) to check if the UE is paged, i.e. an incoming Paging message on Physical Downlink Shared Channel (PDSCH) or there is an indication in Short Message on Physical Downlink Control Channel (PDCCH) that there is a system information (SI) update or a new Earthquake and Tsunami Warning System (ETWS) or Commercial Mobile Alert System (CMAS) message in System Information (SI). This wake-up event every DRX cycle is the main factor that determines the UE power consumption in Idle/Inactive mode, i.e. it determines the UE standby time.

Usually, when the UE wakes up to monitor its PO during a DRX cycle there is no paging. The UE can save power when a Wake-Up Signal (WUS) in LTE or Paging Early Indication (PEI) in New Radio (NR) is configured preceding the PO, which requires the less power for the UE to monitor. FIG. 1 shows a comparison between the required power to receive PEI/WUS, Paging PDCCH and Paging PDSCH.

When the WUS/PEI is detected, indicating/triggering wakeup, the UE will monitor the following PO (Paging PDCCH). Otherwise, the UE will go to sleep again. A PEI/WUS saves power only when the PEI/WUS is not triggered, which is typically most of the times. If the PEI/WUS would be triggered most of the times, then the UE would basically wakeup one time too many, and the UE's power consumption would instead increase. Thus, the PEI/WUS is effective and saves power when, most of the times, it is not triggered.

In case Cross Slot Scheduling (CSS) is configured and used, then the UE wakes up a third time when there is a Paging message on PDSCH (Paging PDSCH). When CSS is not used and the Paging message on PDSCH immediately follows the Paging PDCCH (K0=0), the UE cannot avoid receiving Paging message on PDSCH. The K0 value specifies the number of slots between PDCCH and PDSCH, i.e. it is a time offset. When K0-0, the PDSCH immediately follows the PDSCH. The Network (NW) configures a list of possible K0 values that it may use in SI, so that the UE knows in advance which possible values the NW may use. The actual value that is used, is signaled in the PDCCH transmission itself, i.e. an index to the list in system information is included. Hereby, when the UE receives the PDCCH, it knows what time offset it can expect to receive the following PDSCH.

Multiple UEs may be monitoring the same PO, and all UEs monitoring this PO will receive the Paging message on PDSCH. The UEs, for which the Paging message is not intended, will discard it. When the UE receives a Paging message that is not for that UE, this is referred to as false paging. To reduce the risk of false paging, the UEs can be divided/assigned into groups by the NW, and it is indicated in PEI or Paging PDCCH to which group the Paging message on PDSCH is transmitted. This enables UEs in the other groups to avoid receiving this Paging message (i.e. avoid false paging). In LTE, WUS paging groups where introduced in 3GPP Release 16 (Rel-16) to further reduce the false paging.

When the Core Network (CN) needs to page the UE, e.g. because there is downlink (DL) data, then the CN triggers the gNB to transmit a Paging message on PDSCH to that UE. The CN knows where the UE, that it is trying to reach, was located the last time the UE was in connected mode. Stated differently, the CN knows the "last used cell" of the UE. Typically, the CN first tries to page the UE in that cell, and if the UE has not moved out of that cell, then the UE will reply to the first paging attempt of the CN. However, if the UE does not reply to the first paging attempt of the CN, the CN typically tries to page the UE in a wider geographical area including more cells (e.g. complete tracking area (TA)). This second step is called paging escalation and this step may involve many cells where the UE is paged due to mobility.

The PEI/WUS may be triggered frequently due to paging escalation when:

- Every time the CN uses a paging strategy where the UE is paged in the complete Tracking Area (TA), with the aim to minimize the overall paging latency.
- There is high mobility, i.e. even if the CN does not page in the complete TA all the time, the first paging attempt is more likely to fail.
- The paging rate is high, which causes more paging escalations.
- The TA is large, i.e. a failed paging attempt triggers paging in many cells.

In LTE the WUS is only used in the last used cell because:

- Paging escalation may cause the WUS to be triggered frequently and thus not result in UE power saving, i.e. a single mobile UE will, if WUS is used in the entire TA and not only the last used cell, cause false paging for a large number of UEs in the entire TA (the increase in the false paging ratio is proportional to the number of cells in the TA, e.g. ×100 with 100 cells in the TA).

Paging escalation causes a lot of NW transmissions, which increase the NW energy consumption and reduces the system bandwidth.

The LTE WUS restriction has been hardcoded in 3GPP Technical Specification (TS) 36.300. e.g. V 16.5.0, “E-UTRAN; Overall description; Stage 2”:

“The UE monitors (G)WUS only in the last used cell . . . ;”.

The PEI in NR was being discussed in the 3GPP Release 17 work item “UE power saving” with work item code “NR_UE_pow_sav_enh” at the time of the priority date of May 10, 2021. At that time, it was undecided in 3GPP if the UE should only monitor PEI in the last used cell as in LTE.

SUMMARY

It is an object of the present disclosure to provide methods and apparatus for controlling the use of PEI/WUS to support increased power efficiency.

For example, according to certain embodiments, methods and systems are provided that introduce the configurability of PEI and/or applicability of PEI upon mobility on a per UE basis. This is a further enhancement beyond just hardcoding in the specifications that PEI is only monitored in the last used cell (as in LTE).

For example, according to certain embodiments, the use of PEI may be limited to stationary UEs and/or UEs that do not move frequently among many cells. This may be achieved by the following:

Allow only certain UE types (e.g. Reduced Capability (RedCap) UEs, sensors, based on mobility, or alike) to be allowed to rely on PEI during mobility among cells (i.e. PEI is applied also in other cells that ‘the last used cell’).

Control by the network (NW) via system information to indicate whether PEI is only to be monitored in last used cell or any cell. In case “last used cell” is configured, then only a UE that has not changed cell since last connection shall rely on monitoring PEI in that cell.

Control by the NW of PEI applicability during mobility via dedicated configuration sent to the UE. This configuration is stored in the UE context that is stored in the Core Network (CN), e.g. as part of UE paging capabilities, and also conveyed in the Paging message to the gNB in case of CN initiated paging. In case of gNB initiated paging, the gNB-Control Unit (CU) conveys the information to the gNB-Distributed Unit (DU).

Control by the NW of PEI applicability area configured in a UE via dedicated configuration. An area (e.g. RAN registration area, or a list of cells) is configured in a dedicated message such as RRCRelease to which the PEI transmission is applicable.

An embodiment of the disclosure provides a method for a network node. The method comprises based on a characteristic associated with a wireless device and/or a cell in which the wireless device is located, determining whether to use PEI and/or WUS for the wireless device in a last cell used by the wireless device.

A further embodiment of the disclosure provides a method for a wireless device. The method comprises receiving, from a network node, a message comprising an indication that the wireless device is to monitor for a PEI and/or a WUS for the wireless device in a last cell used by the wireless device.

Further embodiments provide network nodes and wireless devices configured to perform the methods as defined herein.

Certain embodiments may provide one or more of the following technical advantages. For example, one technical advantage may be that certain embodiments enable the UE to continue to save power by monitoring WUS/PEI, because WUS/PEI is not frequently triggered due to paging escalation, i.e. due to the mobility of the UE. As another example, a technical advantage may be that certain embodiments enable the NW to save power because the number of WUS/PEI transmissions are limited (e.g. to last used cell for mobility UEs).

Other advantages may be readily apparent to one having skill in the art. Certain embodiments may have none, some, or all of the recited advantages.

BRIEF DESCRIPTION OF THE DRAWINGS

For better understanding of the present disclosure, and to show how it may be put into effect, reference will now be made, by way of example only, to the accompanying drawings, in which.

DETAILED DESCRIPTION

Figure 1:
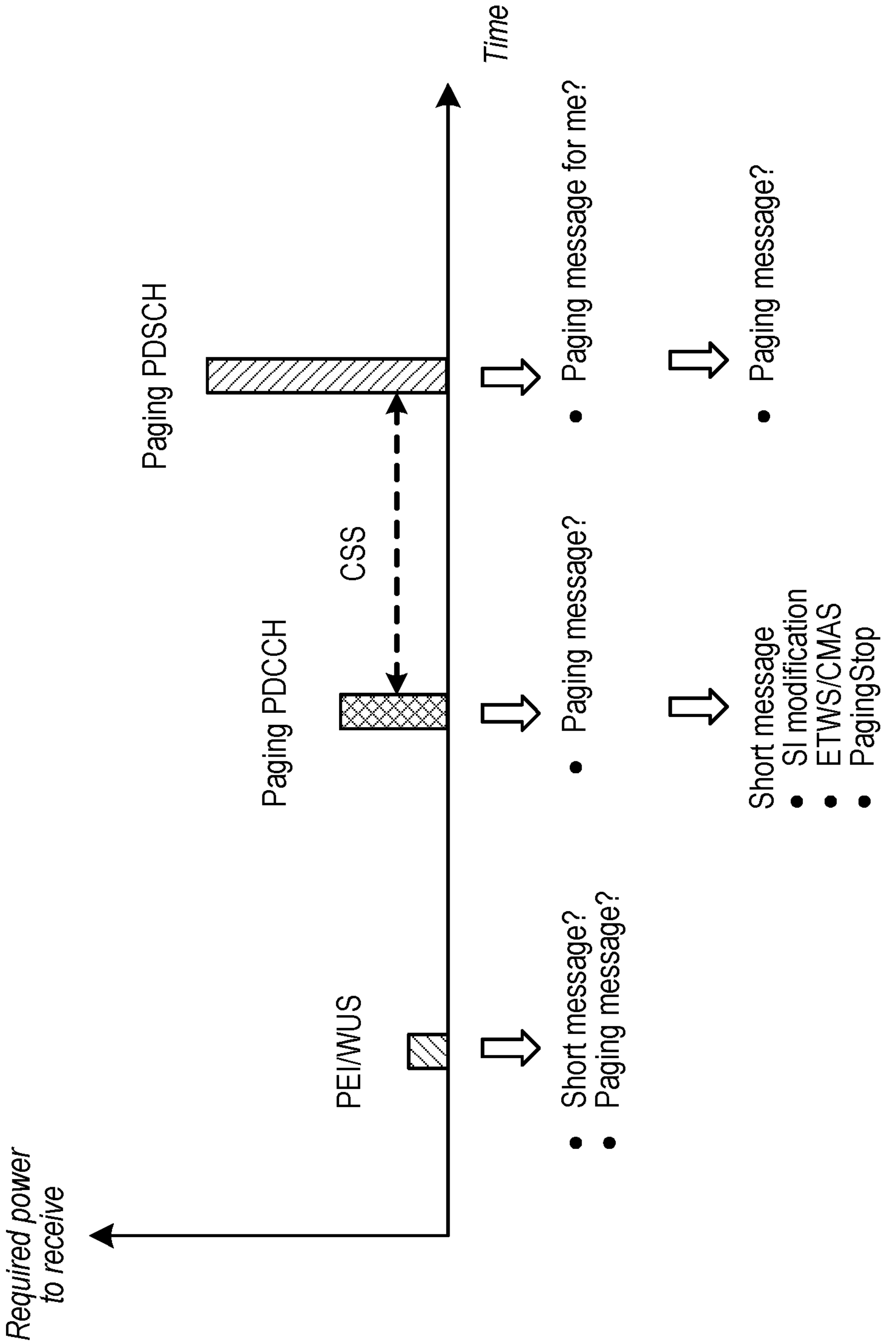
FIG. 1 is a diagram showing a comparison between the required power to receive PEI/WUS, Paging PDCCH and Paging PDSCH.

Certain problems exist with existing systems. For example, if the PEI is always restricted to the last used cell, no mobile UEs may benefit from monitoring PEI. It may be desired for the NW to allow certain specific/prioritized UEs to enjoy from benefits of PEI even though they are mobile. On the other hand, if the PEI is never restricted to the last used cell (i.e., all mobile UEs may use PEI) the NW may suffer from excessive PEI transmissions during paging escalation due to mobility, which also causes increased false paging for other UEs in the same PEI group.

Methods and systems are provided that introduce the configurability of PEI and/or applicability of PEI upon mobility on a per UE basis. This is a further enhancement beyond just hardcoding in the specifications that PEI is only monitored in the last used cell (as in LTE).

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. According to certain embodiments, In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSc UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

Instead of simply hard coding in the specifications that PEI is only monitored in the last used cell (as in LTE), certain embodiments disclosed herein further aim to introduce configurability of PEI and/or applicability of PEI upon mobility on a per UE basis, or per cell basis, as per any one or more of the following aspects:

- PEI is only monitored in last used cell, except for certain UE types that are stationary or have low mobility. An example is RedCap UEs (e.g. sensors) that are not very mobile and thus do not generate a lot of paging escalation. This can be generalized to a UE-specific configuration for whether or not a UE should monitor PEI only in 'the last used cell' or in any cell.
- A parameter in system information indicates whether PEI is only monitored by UEs in the cell that where in connected mode last time in this cell or is monitored by all UEs in the cell. In case "last used cell" is configured, then only a stationary UE in the cell will monitor PEI in that cell. Otherwise, all UEs in the cell use PEI to monitor paging.
- A parameter configured during registration (update) in the UE. The parameter configuration could depend on the UE type (e.g. RedCap UE) or subscription information available for that UE (e.g. a stationary UE, or a UE of low expected mobility). This configuration is stored in the UE context, e.g. as part of the UE paging capabilities, and also conveyed in the Paging message to the gNB in case of CN initiated paging. In case of gNB initiated paging, the gNB-CU conveys the information to the gNB-DU.
- A parameter configured in a dedicated message such as RRCRelease message based on the UE mobility (or other aspects). For example, when the UE is very mobile, e.g. based on reported history info or handover statistics, the PEI is restricted to last used cell. This enables the NW to restrict PEI to last used cell for mobile UEs that potentially cause much paging escalation. This configuration is stored in the UE context, and conveyed in the Paging message to the gNB in case of CN initiated paging. In case of gNB initiated paging, the gNB-Central Unit (CU) conveys the information to the gNB-Distributed Unit (DU).
- An area (e.g. RAN registration area, or a list of cell identities) configured in a dedicated message such as RRCRelease to which the PEI transmission is applicable. For example, in case the NW detects that the UE is mainly moving between two cells, those two cells are configured as the area in which PEI is applicable.
- In one particular embodiment, the UE monitors paging using PEI in cell which is not the last used cell based on the combination of the 'monitor PEI only in the last used cell'-configuration in the current cell (in SI broadcast), and the 'monitor PEI only in the last used cell'-configuration of the UE (UE-specific).
  - In one non-limiting example, the 'monitor PEI only in the last used cell'-configuration is of Boolean type.
  - In one non-limiting example, when the UE receives both a dedicated configuration via RRCRelease or Registration and a cell specific configuration via system information, that it is specified how the UE should use the combination (e.g. the cell specific configuration overrides the dedicated configuration, or vice versa), or that it is made configurable via signaling how to use the combination.

Figure 2:
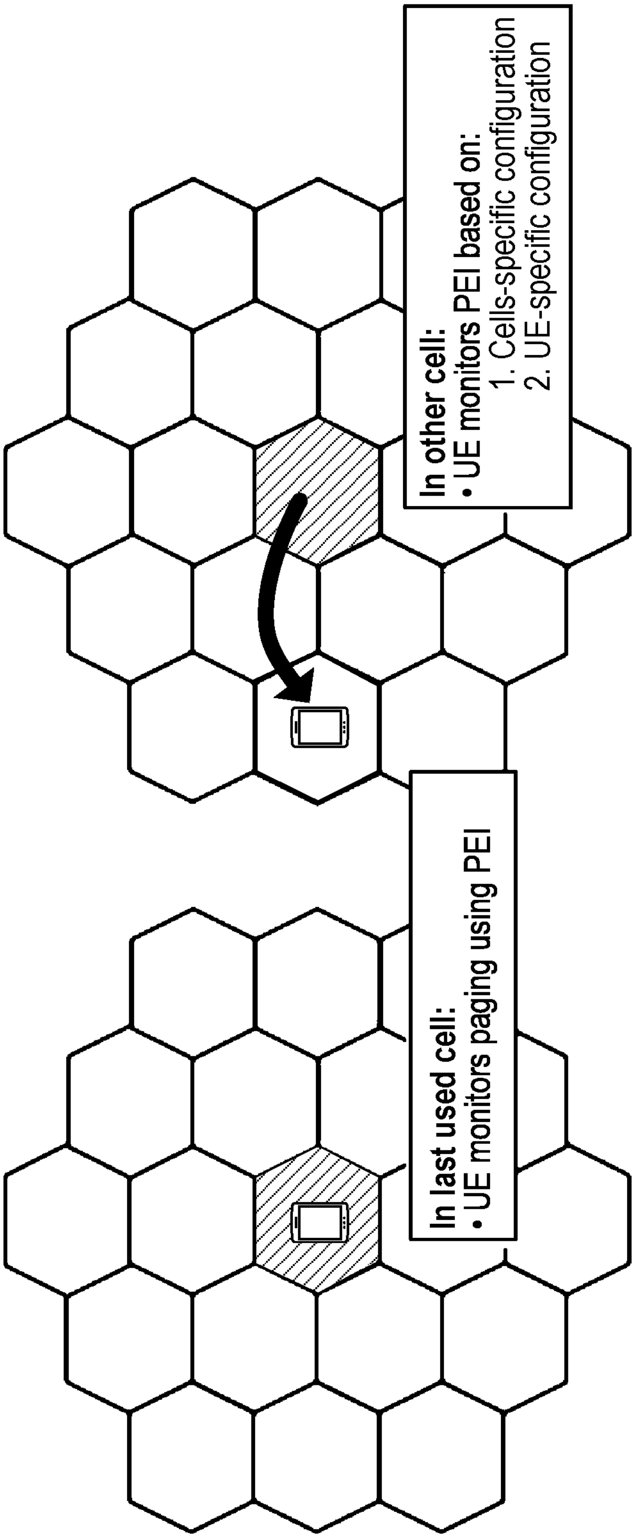
FIG. 2 is a schematic illustration of the application of PEI in an other cell than the last used cell.

The enhancements discussed in the bullets above is shown schematically in FIG. 2. The left-hand side of FIG. 2 illustrates a UE that monitors PEI in its last used cell. In the right-hand side of FIG. 2, the UE is moving to another cell, and before that cell is used by the UE, the UE may or may not be allowed to monitor PEI depending on Cell- or UE-specific configuration provided by the NW to the UE.

The enhancements can also be made applicable for UEs in a later release in LTE, but not for UEs in LTE compliant with 3GPP Rel-16 or prior releases. Thus, such an LTE UE will monitor WUS only in the last used cell. But e.g. for 3GPP Rel-17 or later compliant LTE UEs new rules and signalling could be introduced that enable the WUS to be used in other cases as well.

Figure 3:
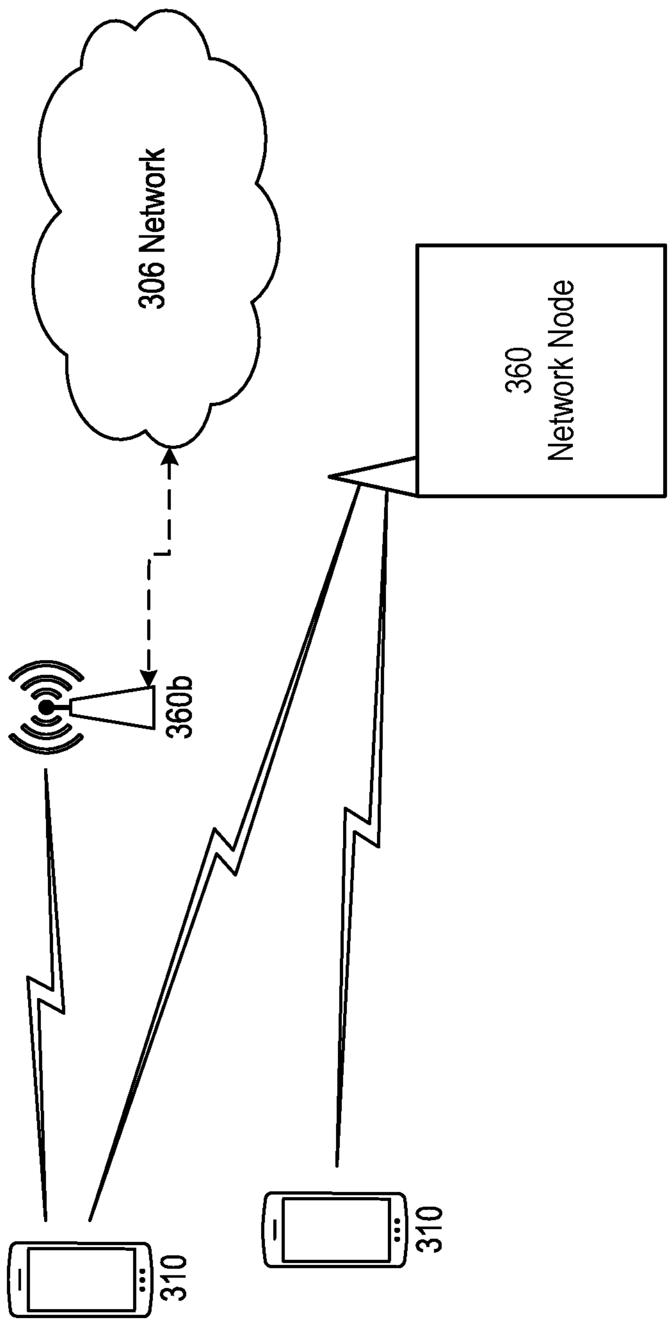
FIG. 3 illustrates a wireless network, in accordance with some embodiments.

FIG. 3 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160*b*, and wireless devices 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 4:
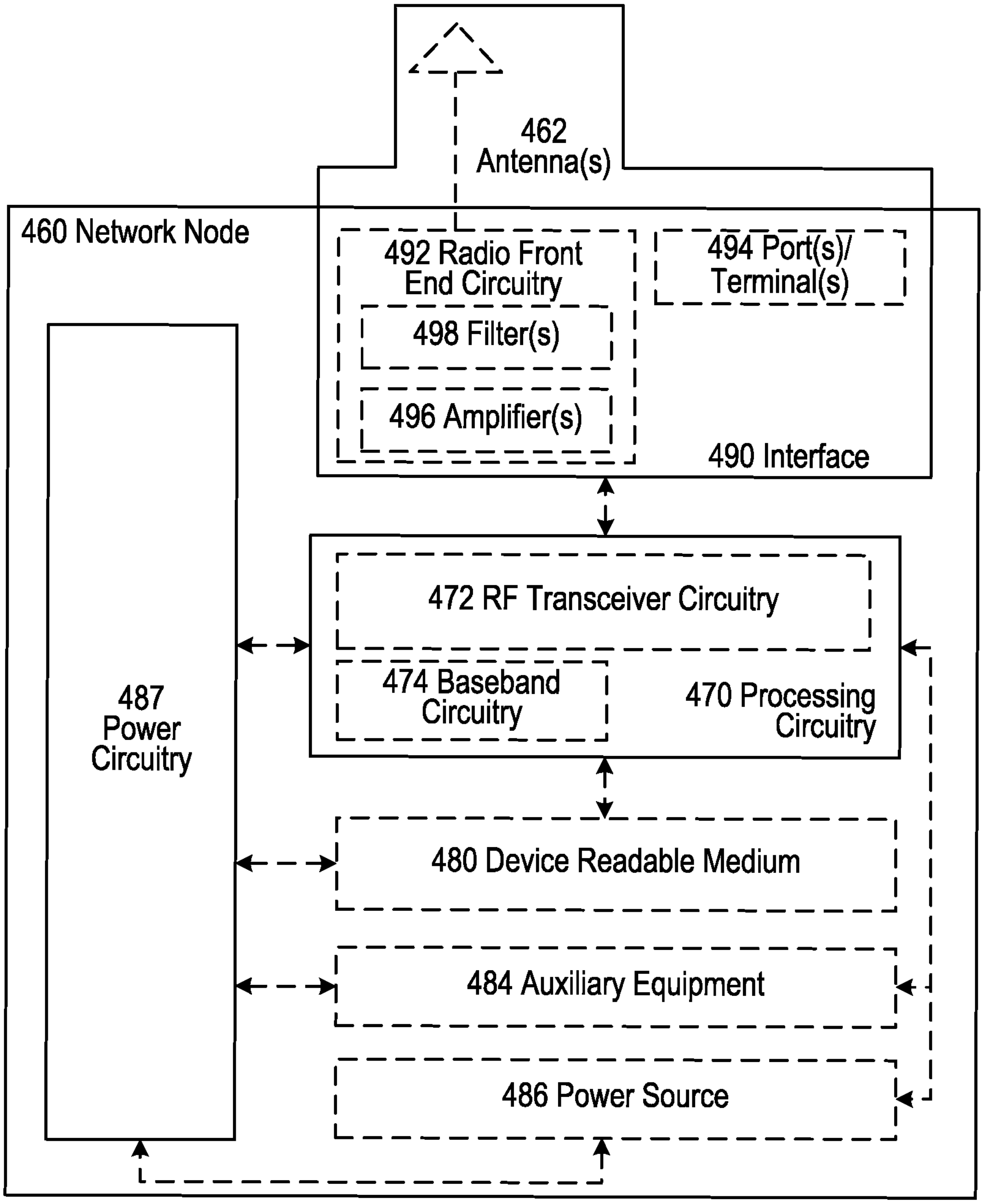
FIG. 4 illustrates an example network node, according to some embodiments.

FIG. 4 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 5:
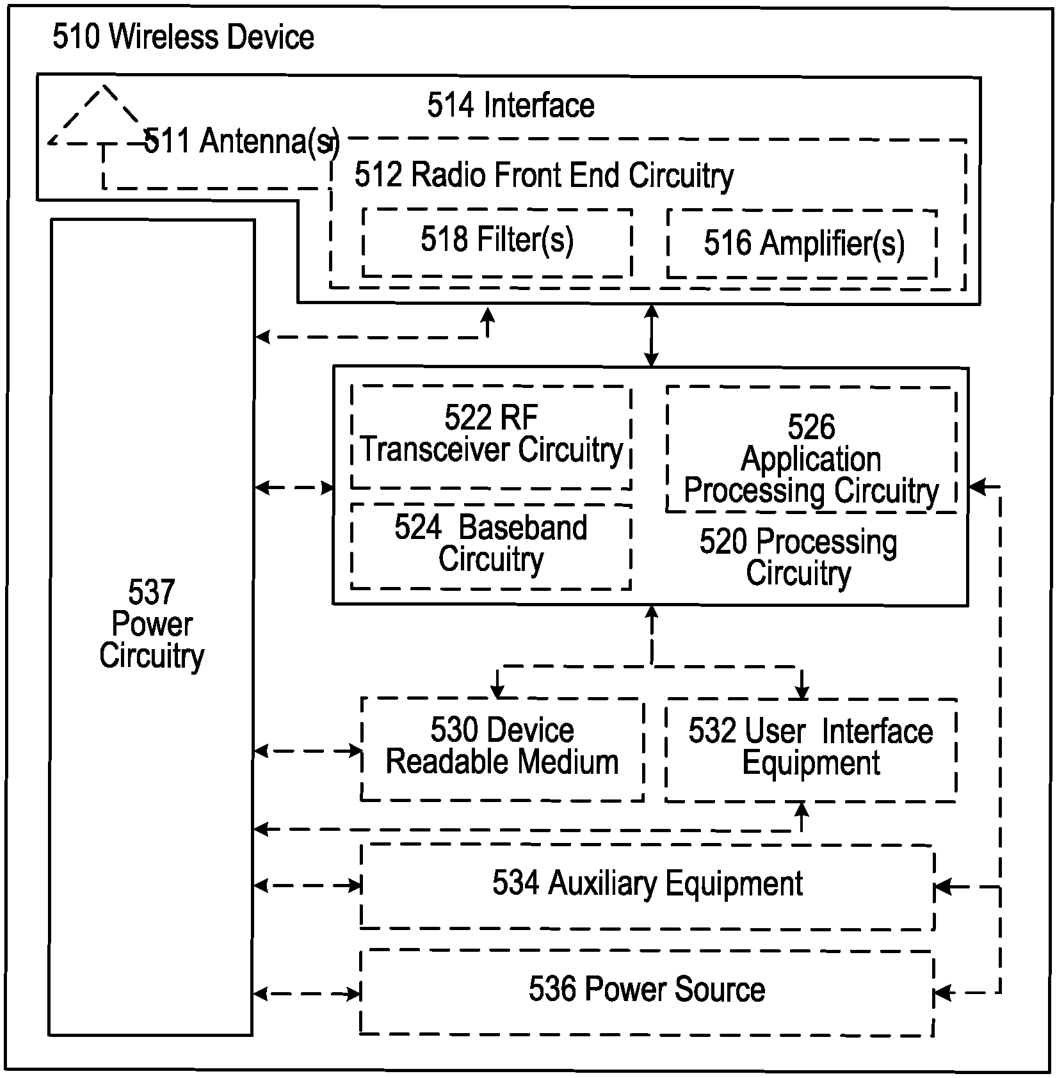
FIG. 5 illustrates an example wireless device in accordance with some embodiments.

FIG. 5 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 6:
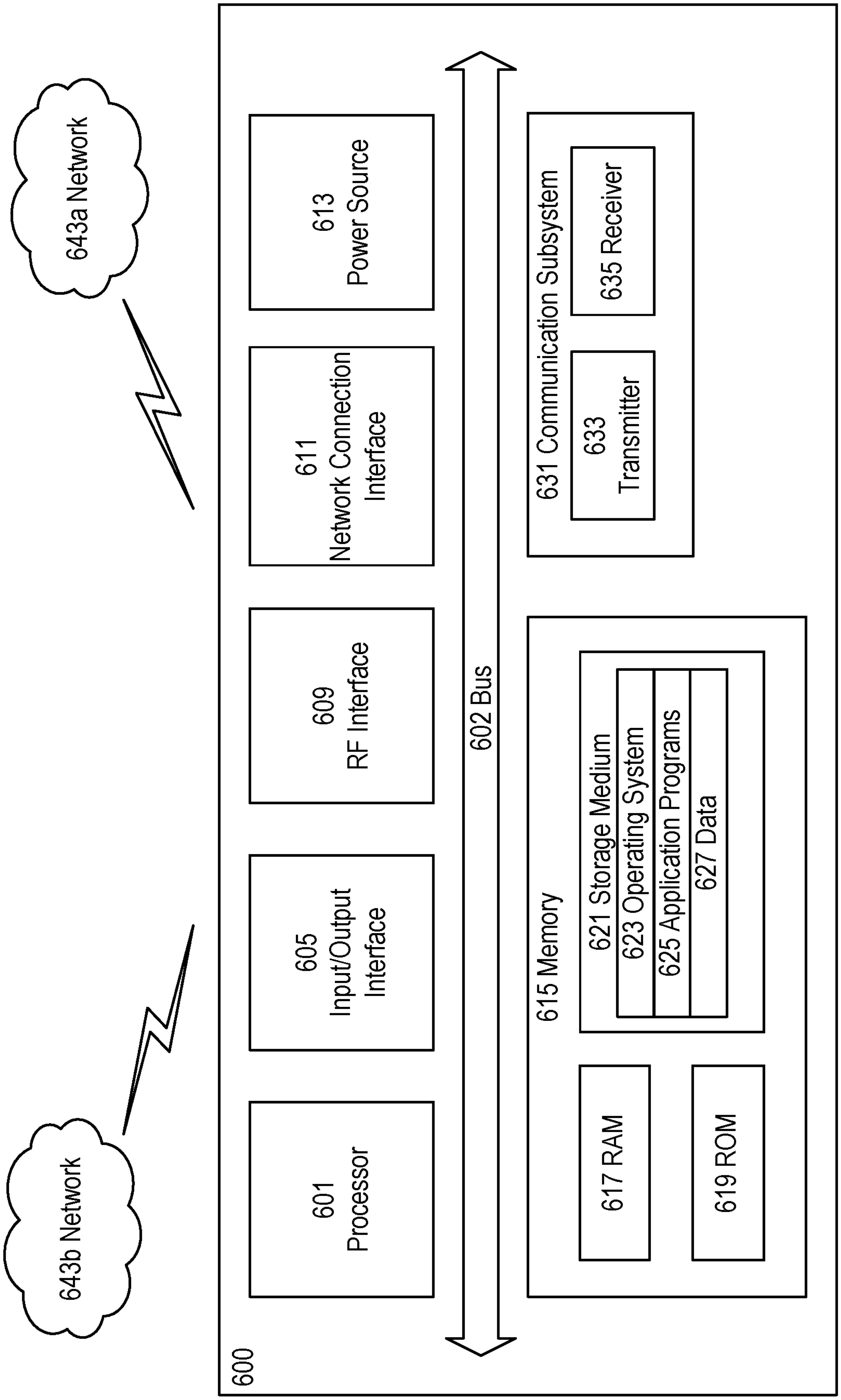
FIG. 6 illustrates one embodiment of a UE in accordance with various aspects.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 600 may be any UE identified by the 3$^{rd}$ Generation Partnership Project (3GPP), including a NB-IOT UE, a machine type communication (MTC) UE, and/or an enhanced MTC (eMTC) UE. UE 600, as illustrated in FIG. 4, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643*a*. Network 643*a* may encompass wired and/or wireless networks such as a local-area network (LAN), a wide-area network (WAN), a computer network, a wireless network, a telecommunications network, another like network or any combination thereof. For example, network 643*a* may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network **643*b* using communication subsystem 631. Network 643*a* and network 643*b* may be the same network or networks or different network or networks. Communication subsystem 631 may be configured to include one or more transceivers used to communicate with network 643*b*. For example, communication subsystem 631 may be configured to include one or more transceivers used to communicate with one or more remote transceivers of another device capable of wireless communication such as another wireless device, UE, or base station of a radio access network (RAN) according to one or more communication protocols, such as IEEE 802.6, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635** of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network **643*b* may encompass wired and/or wireless networks such as a local-area network (LAN), a wide-area network (WAN), a computer network, a wireless network, a telecommunications network, another like network or any combination thereof. For example, network 643*b* may be a cellular network, a Wi-Fi network, and/or a near-field network. Power source 613 may be configured to provide alternating current (AC) or direct current (DC) power to components of UE 600**.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
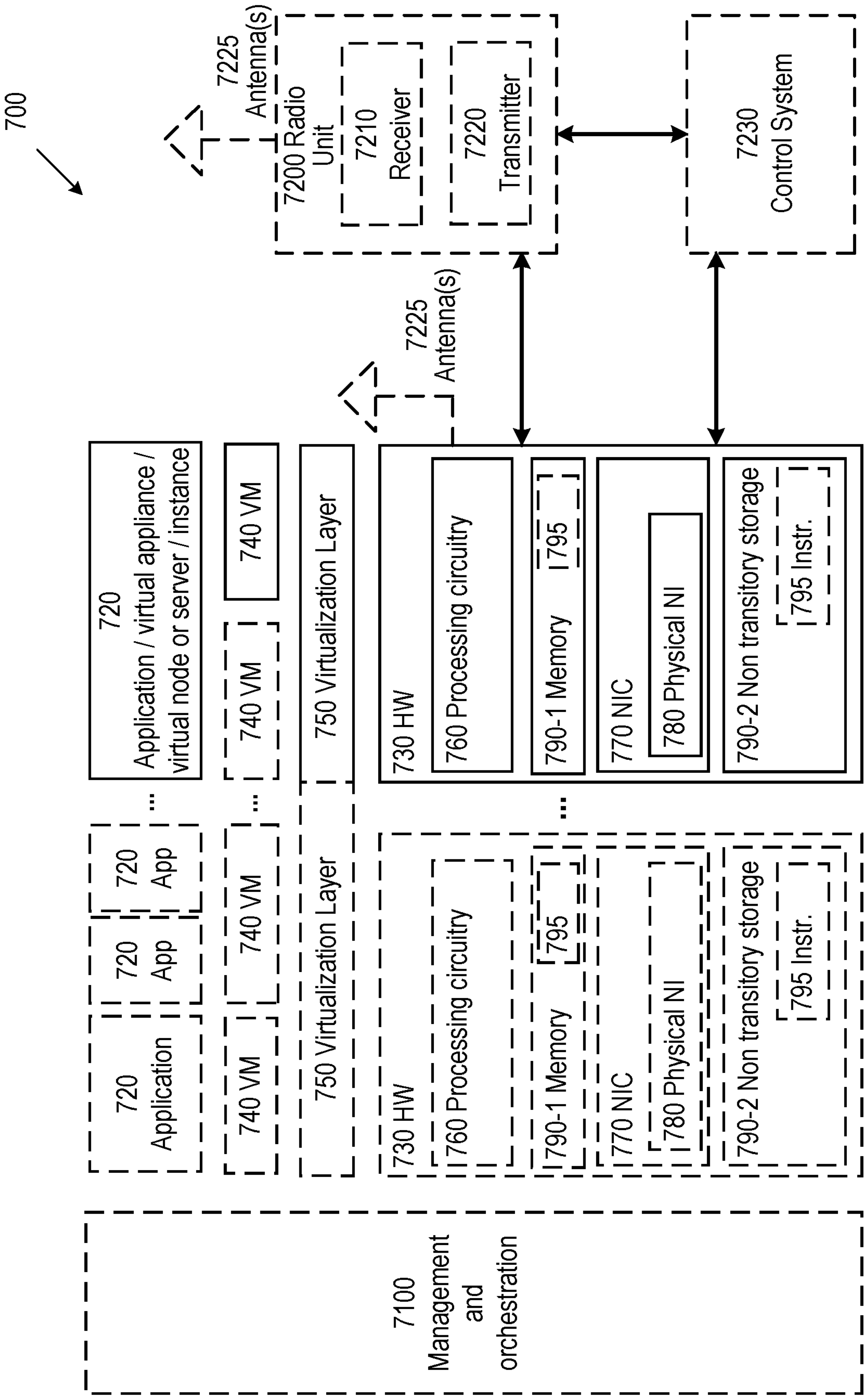
FIG. 7 is a schematic block diagram illustrating a virtualization environment in accordance with some embodiments.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV. Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signaling can be affected with the use of control system 7230 which may alternatively be used for communication between the hardware nodes 730 and radio units 7200.

Figure 8:
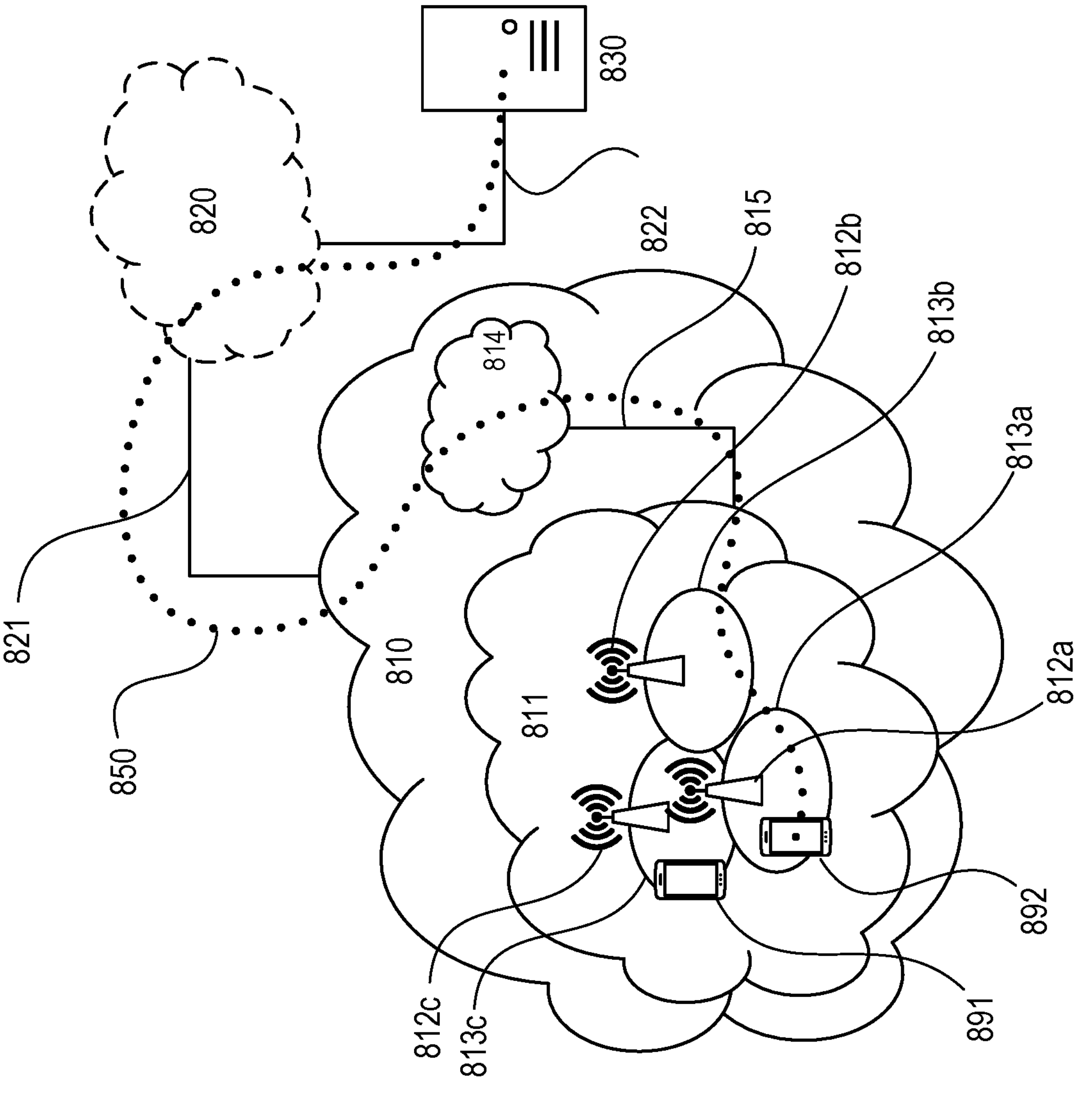
FIG. 8 illustrates a telecommunication network connected via an intermediate network to a host computer in accordance with some embodiments.

FIG. 8 illustrates a telecommunication network connected via an intermediate network to a host computer in accordance with some embodiments.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812*a*, 812*b*, 812*c*, such as NBs, eNBs, gNBs or other types of wireless access points, each defining a corresponding coverage area 813*a*, 813*b*, 813*c*. Each base station 812*a*, 812*b*, 812*c* is connectable to core network 814 over a wired or wireless connection 815. A first UE 891 located in coverage area 813*c* is configured to wirelessly connect to, or be paged by, the corresponding base station 812*c*. A second UE 892 in coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 9:
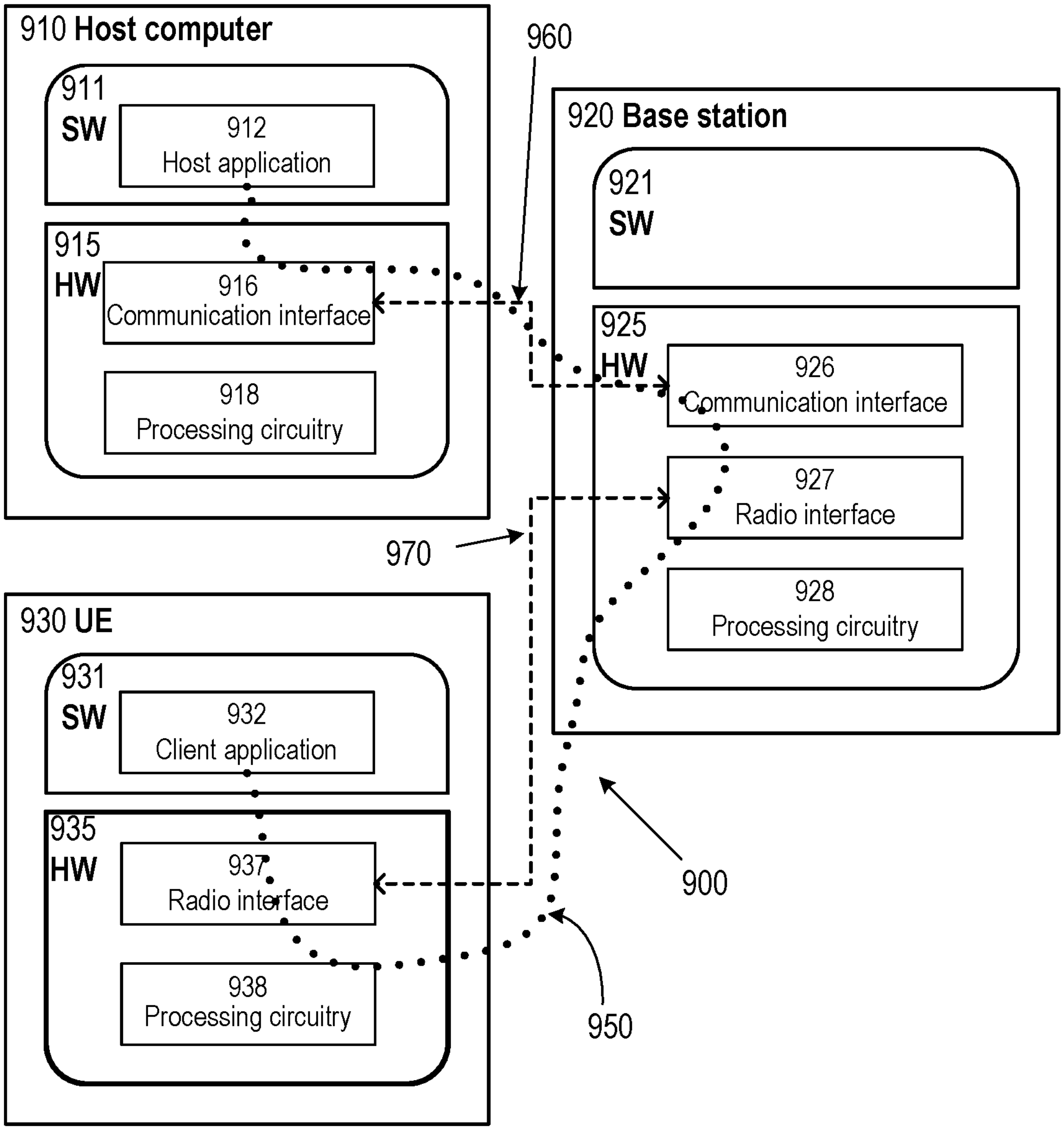
FIG. 9 illustrates a host computer communicating via a base station with a user equipment over a partially wireless connection in accordance with some embodiments.

FIG. 9 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 9 may be similar or identical to host computer 830, one of base stations 812*a*, 812*b*, 812*c* and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
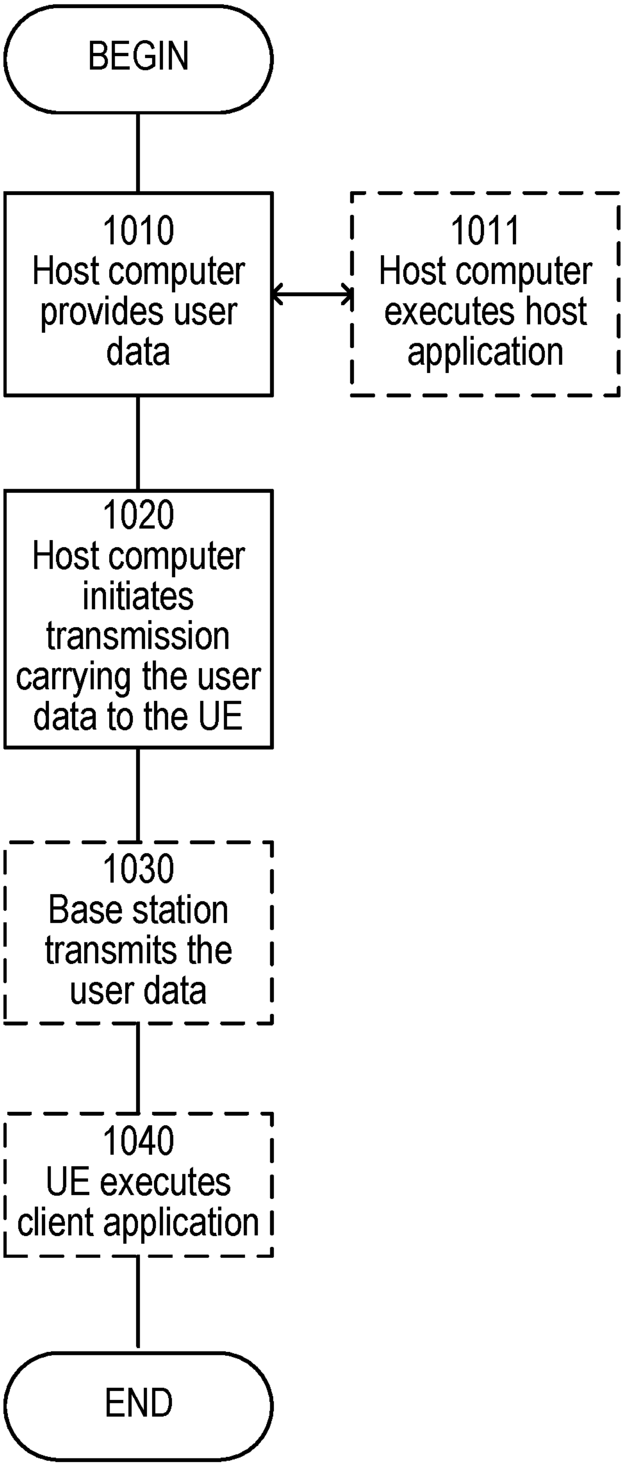
FIG. 10 is a flowchart illustrating a method implemented in a communication system in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
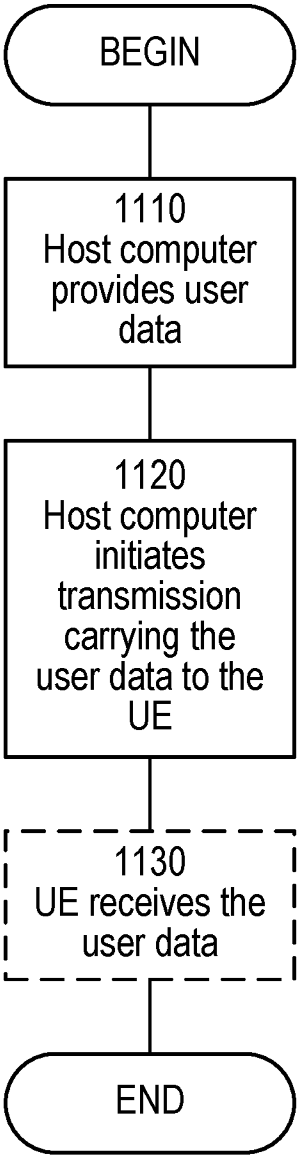
FIG. 11 is a flowchart illustrating a method implemented in a communication system in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
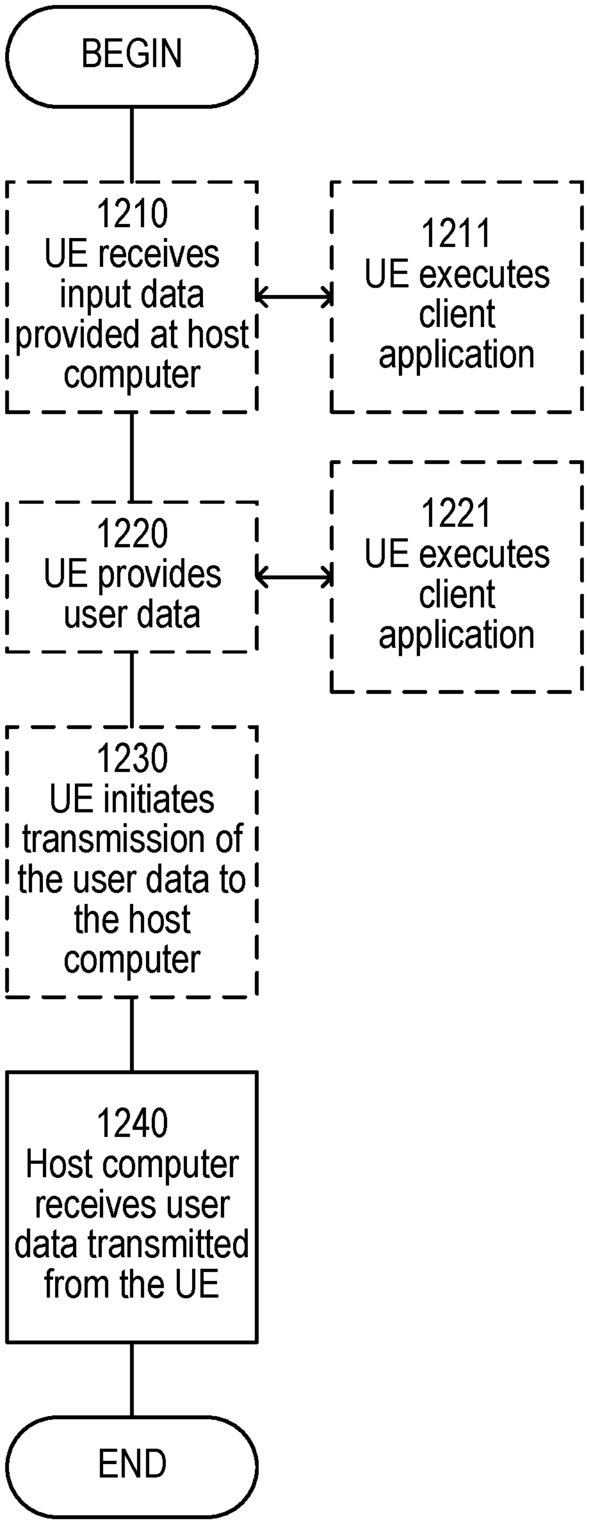
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
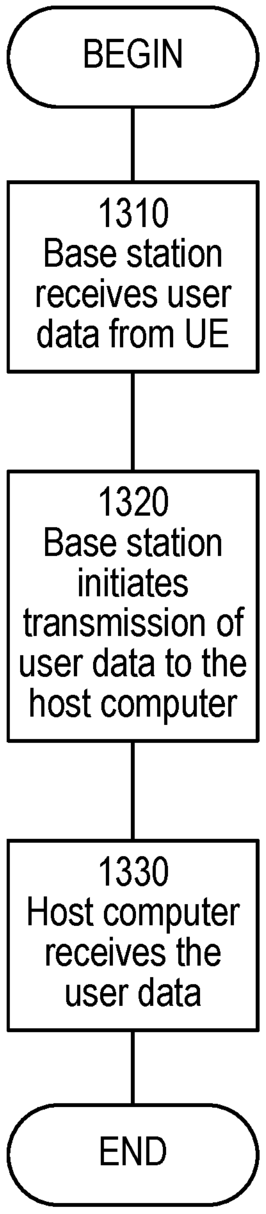
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Figure 14:
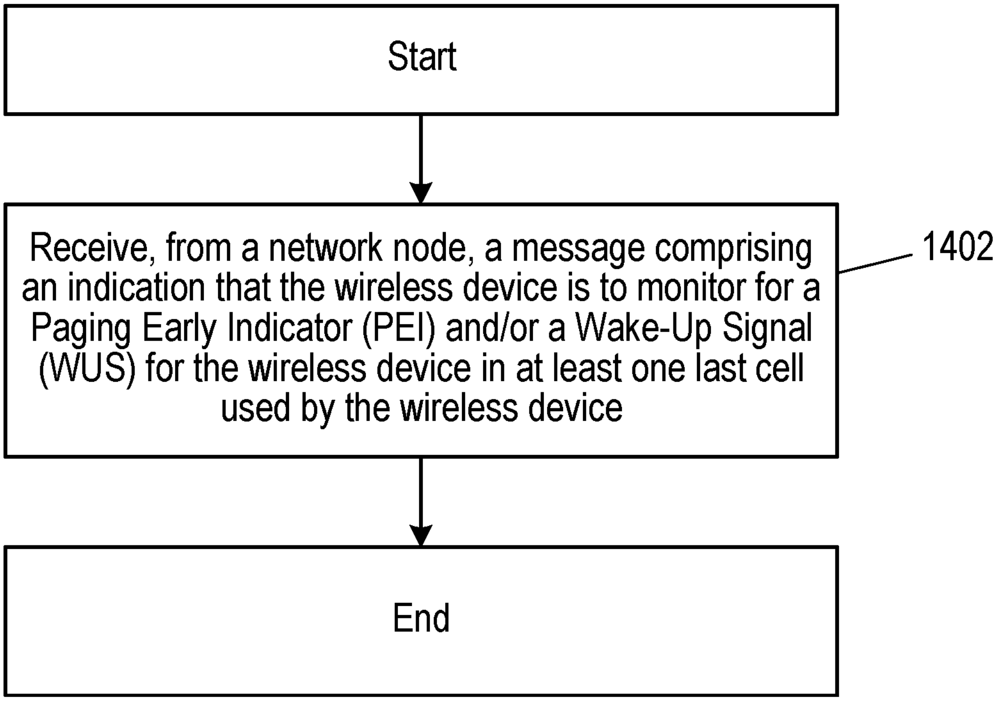
FIG. 14 is a flowchart illustrating a method by a wireless device, according to some embodiments.

FIG. 14 depicts a method by a wireless device, according to certain embodiments. At step 1402, the wireless device receives, from a network node, a message comprising an indication that the wireless device is to monitor for a PEI and/or a WUS for the wireless device in the one last cell used by the wireless device.

In a particular embodiment, the indication is received based on a characteristic associated with a wireless device and/or a cell in which the wireless device is located.

In a particular embodiment, the wireless device transmits, to the network node or another network node, information indicating the characteristic associated with the wireless device and/or the cell in which the wireless device is located.

In a particular embodiment, the characteristic associated with the wireless device is based on a level of mobility of the wireless device.

In a particular embodiment, the level of mobility of the wireless device is stationary.

In a particular embodiment, the level of mobility is determined based on a location history of the mobility of the wireless device.

In a particular embodiment, the level of mobility is determined based on handover statistics associated with the wireless device.

In a particular embodiment, the characteristic indicates that the level of mobility of the wireless device is below a threshold.

In a particular embodiment, the characteristic associated with the wireless device is based on a type of the wireless device.

In a particular embodiment, the type of the wireless device is a reduced capability wireless device.

In a particular embodiment, the indication comprises a Boolean type indication.

In a particular embodiment, the message is received in system information.

In a particular embodiment, the message is associated with a registration or update procedure.

In a particular embodiment, the message is a Radio Resource Control message such as, for example a RRCRelease message.

In a particular embodiment, the characteristic associated with the wireless device is associated with subscription information for/associated with the wireless device.

In a particular embodiment, the characteristic associated with the wireless device is associated with a context stored for the wireless device.

In a particular embodiment, the at least one last cell used by the wireless device comprises a plurality of last cells used by the wireless device.

In a particular embodiment, based on the message, the wireless device monitors for the PEI and/or the WUS in the at least one last cell used by the wireless device.

In a particular embodiment, the wireless device monitors in at least one additional cell, which is not a cell in the at least one last cell used by the wireless device, for the PEI and/or the WUS.

In a particular embodiment, the at least one additional cell is monitored based on a configuration associated with a current cell in which the wireless device is located.

In a particular embodiment, the wireless device comprises a user equipment (UE).

In various particular embodiments, the method may additionally or alternatively include one or more of the steps or features of the Group A, Group C, and Group E Example Embodiments described below.

Figure 15:
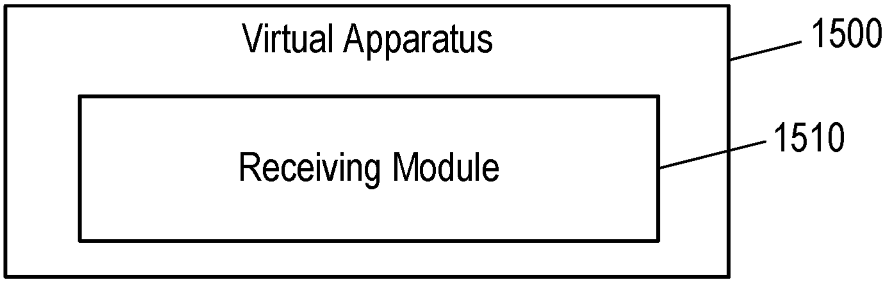
FIG. 15 is a schematic diagram of a virtual apparatus according to some embodiments.

FIG. 15 illustrates a schematic block diagram of a virtual apparatus 1500 in a wireless network (for example, the wireless network shown in FIG. 3). The apparatus may be implemented in a wireless device or network node (e.g., wireless device 110 or network node 160 shown in FIG. 3). Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510 and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive, from a network node, a message comprising an indication that the wireless device is to monitor for a PEI and/or a WUS for the wireless device in at least one last cell used by the wireless device.

Optionally, in particular embodiments, virtual apparatus may additionally include one or more modules for performing any of the steps or providing any of the features in the Group A, Group C, and Group E Example Embodiments described below.

As used herein, the term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
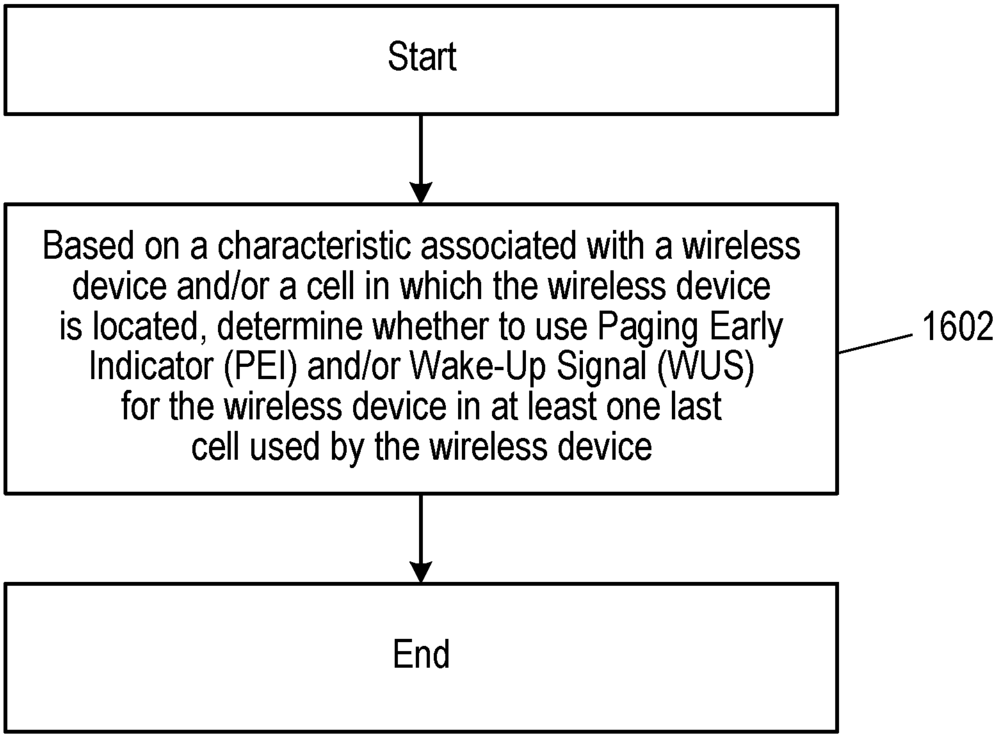
FIG. 16 is a flowchart illustrating a method by a network node, according to some embodiments.

FIG. 16 depicts a method by a network node, according to certain embodiments. At step 1602, based on a characteristic associated with a wireless device and/or a cell in which the wireless device is located, the network node determines whether to use PEI and/or WUS for the wireless device in the last cell used by the wireless device.

In a particular embodiment, the characteristic associated with the wireless device is based on a level of mobility of the wireless device.

In a particular embodiment, the level of mobility of the wireless device is stationary.

In a particular embodiment, the level of mobility is determined based on a reported history of the mobility of the wireless device.

In a particular embodiment, the level of mobility is determined based on handover statistics associated with the wireless device.

In a particular embodiment, the level of mobility is received from and/or based on a message received from a core network.

In a particular embodiment, determining whether to use PEI and/or WUS for the wireless device includes determining that the level of mobility of the wireless device is below a threshold and determining to use PEI and/or WUS in the last cell used by the wireless device based on the level of mobility of the wireless device being below the threshold.

In a particular embodiment, the characteristic associated with the wireless device is based on a type of the wireless device.

In a particular embodiment, determining whether to use PEI and/or WUS in the last cell used by the wireless device comprises: determining that the type of the wireless device is a reduced capability wireless device; and determining to use PEI and/or WUS in the at least one last cell used by the wireless device based on the wireless device being the reduced capability wireless device.

In a particular embodiment, the network node determines, based on the characteristic associated with the wireless device and/or the cell in which the wireless device is located, that PEI and/or WUS is to be used in the at least one last cell used by the wireless device. The method further includes transmitting, to the wireless device, a message indicating that the wireless device is to monitor for PEI and/or WUS in the at least one last cell used by the wireless device.

In a particular embodiment, the message comprises an indicator of a Boolean type, the indicator indicating that the wireless device is to monitor for PEI and/or WUS in the at least one last cell used by the wireless device.

In a particular embodiment, the message is transmitted in system information.

In a particular embodiment, the message comprises a parameter that indicates that the wireless device is to monitor for PEI and/or WUS in the at least one last cell used by the wireless device.

In a particular embodiment, the message is associated with a registration or update procedure.

In a particular embodiment, the message is a Radio Resource Control message such as, for example a RRCRelease message.

In a particular embodiment, the characteristic associated with the wireless device is associated with subscription information for/associated with the wireless device.

In a particular embodiment, the characteristic associated with the wireless device is associated with a context stored for the wireless device.

In a particular embodiment, the context is received from a core network node in a message associated with core network-initiated paging.

In a particular embodiment, the context is received from a Distributed Unit of a gNodeB node in a message associated with gNB-initiated paging.

In a particular embodiment, the at least one last cell used by the wireless device comprises a plurality of cells last used by the wireless device.

In a particular embodiment, the network node comprises a gNodeB (gNB).

In various particular embodiments, the method may include one or more of any of the steps or features of the Group B, Group D, and Group E Example Embodiments described below.

Figure 17:
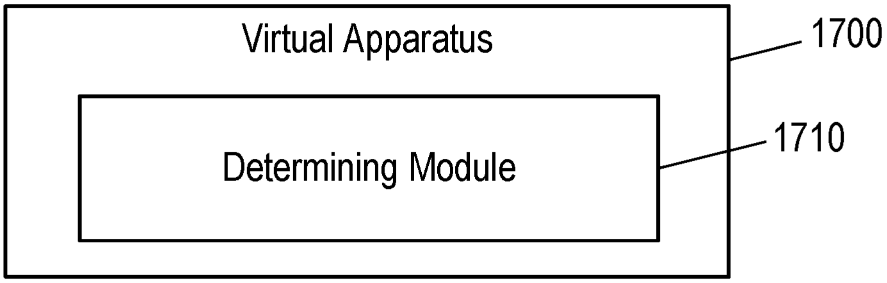
FIG. 17 is a schematic diagram of a virtual apparatus according to some embodiments.

FIG. 17 illustrates a schematic block diagram of a virtual apparatus 1700 in a wireless network (for example, the wireless network shown in FIG. 3). The apparatus may be implemented in a wireless device or network node (e.g., wireless device 110 or network node 160 shown in FIG. 3). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1710 and any other suitable units of apparatus 1700 to perform corresponding functions according one or more embodiments of the present disclosure.

According to certain embodiments, determining module 1710 may perform certain of the determining functions of the apparatus 1700. For example, based on a characteristic associated with a wireless device and/or a cell in which the wireless device is located, the determining module 1710 may determine whether to use PEI and/or WUS for the wireless device in at least one last cell used by the wireless device.

Optionally, in particular embodiments, virtual apparatus may additionally include one or more modules for performing any of the steps or providing any of the features in the Group B. Group D, and Group E Example Embodiments described below.

The following example embodiments provide additional information on the disclosure.

GROUP A EMBODIMENTS

Example Embodiment A1. A method by a wireless device comprising any of the wireless device steps, features, or functions described above, either alone or in combination with other steps, features, or functions described above.

Example Embodiment A2. The method of the previous embodiment, further comprising one or more additional wireless device steps, features or functions described above.

Example Embodiment A3. The method of any of the previous embodiments, further comprising: providing user data; and forwarding the user data to a host computer via the transmission to the base station.

GROUP B EMBODIMENTS

Example Embodiment B1. A method performed by a network node comprising any of the network node steps, features, or functions described above, either alone or in combination with other steps, features, or functions described above.

Example Embodiment B2. The method of the previous embodiment, further comprising one or more additional network node steps, features or functions described above.

Example Embodiment B3. The method of any of the previous embodiments, further comprising: obtaining user data; and forwarding the user data to a host computer or a wireless device.

GROUP C EXAMPLE EMBODIMENTS

Example Embodiment C1. A method by a wireless device comprising: receiving, from a network node, a message comprising an indication that the wireless device is to monitor for a Paging Early Indicator (PEI) and/or a Wake-Up Signal (WUS) for the wireless device in at least one last cell used by the wireless device.

Example Embodiment C2. The method of Example Embodiment C1, wherein indication is received based on a characteristic associated with a wireless device and/or a cell in which the wireless device is located.

Example Embodiment C3. The method of Example Embodiment C2, further comprising transmitting, to the network node or another network node, information indicating the characteristic associated with the wireless device and/or the cell in which the wireless device is located.

Example Embodiment C4. The method of any one of Example Embodiments C2 to C3, wherein the characteristic associated with the wireless device is based on a level of mobility of the wireless device.

Example Embodiment C5. The method of Example Embodiment C4, wherein the level of mobility of the wireless device is stationary.

Example Embodiment C6. The method of Example Embodiment C4, wherein the level of mobility is determined based on a location history of the mobility of the wireless device.

Example Embodiment C7. The method of Example Embodiment C4, wherein the level of mobility is determined based on handover statistics associated with the wireless device.

Example Embodiment C8. The method of Example Embodiment C4, wherein the characteristic indicates that the level of mobility of the wireless device is below a threshold.

Example Embodiment C9. The method of Example Embodiment C4, wherein the characteristic associated with the wireless device is based on a type of the wireless device.

Example Embodiment C10. The method of Example Embodiment C9, wherein the type of the wireless device is a reduced capability wireless device.

Example Embodiment C11. The method of any one of Example Embodiments C1 to C10, wherein the indication comprises a Boolean type indication.

Example Embodiment C12. The method of any one of Example Embodiments C1 to C11, wherein the message is received in system information.

Example Embodiment C11. The method of any one of Example Embodiments C1 to C11, wherein the message is associated with a registration or update procedure.

Example Embodiment C12. The method of Example Embodiment C11, wherein the message is a Radio Resource Control message such as, for example a RRCRelease message.

Example Embodiment C13. The method of any one of Example Embodiments C2 to C12, wherein the characteristic associated with the wireless device is associated with subscription information for/associated with the wireless device.

Example Embodiment C14. The method of any one of Example Embodiments C2 to C13, wherein the characteristic associated with the wireless device is associated with a context stored for the wireless device.

Example Embodiment C15. The method of any one of Example Embodiments C1 to C14, wherein the at least one last cell used by the wireless device comprises a plurality of last cells used by the wireless device.

Example Embodiment C16. The method of any one of Example Embodiments C1 to C15, further comprising: based on the message, monitoring for the PEI and/or the WUS in the at least one last cell used by the wireless device.

Example Embodiment C17. The method of Example Embodiment C16, further comprising monitoring in at least one additional cell, which is not a cell in the at least one last cell used by the wireless device, for the PEI and/or the WUS.

Example Embodiment C18. The method of Example Embodiment C17, wherein the at least one additional cell is monitored based on a configuration associated with a current cell in which the wireless device is located.

Example Embodiment C19. The method of Example Embodiments C1 to C18, wherein the wireless device comprises a user equipment (UE).

Example Embodiment C20. A wireless device comprising processing circuitry configured to perform any of the methods of Example Embodiments C1 to C19.

Example Embodiment C21. A computer program comprising instructions which when executed on a computer perform any of the methods of Example Embodiments C1 to C19.

Example Embodiment C22. A computer program product comprising computer program, the computer program comprising instructions which when executed on a computer perform any of the methods of Example Embodiments C1 to C19.

Example Embodiment C23. A non-transitory computer readable medium storing instructions which when executed by a computer perform any of the methods of Example Embodiments C1 to C19.

GROUP D EMBODIMENTS

Example Embodiment D1. A method by a network node comprising: based on a characteristic associated with a wireless device and/or a cell in which the wireless device is located, determining whether to use Paging Early Indicator (PEI) and/or Wake-Up Signal (WUS) for the wireless device in at least one last cell used by the wireless device.

Example Embodiment D2. The method of Example Embodiment D1, wherein the characteristic associated with the wireless device is based on a level of mobility of the wireless device.

Example Embodiment D3a. The method of Example Embodiment D2, wherein the level of mobility of the wireless device is stationary.

Example Embodiment D3b. The method of Example Embodiment D2, wherein the level of mobility is determined based on a reported history of the mobility of the wireless device.

Example Embodiment D3c. The method of Example Embodiment D2, wherein the level of mobility is determined based on handover statistics associated with the wireless device.

Example Embodiment D3d. The method of any one of Example Embodiments D2 to D3c, wherein the level of mobility is received from and/or based on a message received from a core network.

Example Embodiment D4. The method of any one of Example Embodiments D2 to D3d, wherein determining whether to use PEI and/or WUS for the wireless device comprises:

- determining that the level of mobility of the wireless device is below a threshold; and
- determining to use PEI and/or WUS in the last cell used by the wireless device based on the level of mobility of the wireless device being below the threshold.

Example Embodiment D5. The method of any one of Example Embodiments D1 to D4, wherein the characteristic associated with the wireless device is based on a type of the wireless device.

Example Embodiment D6. The method of Example Embodiment D5, wherein determining whether to use PEI and/or WUS in the last cell used by the wireless device comprises: determining that the type of the wireless device is a reduced capability wireless device; and determining to use PEI and/or WUS in the at least one last cell used by the wireless device based on the wireless device being the reduced capability wireless device.

Example Embodiment D7. The method of any one of Example Embodiments D1 to D6, wherein the network node determines, based on the characteristic associated with the wireless device and/or the cell in which the wireless device is located, that PEI and/or WUS is to be used in the at least one last cell used by the wireless device, and the method further comprises: transmitting, to the wireless device, a message indicating that the wireless device is to monitor for PEI and/or WUS in the at least one last cell used by the wireless device.

Example Embodiment D8a. The method of Embodiment D7, wherein the message comprises an indicator of a Boolean type, the indicator indicating that the wireless device is to monitor for PEI and/or WUS in the at least one last cell used by the wireless device Example Embodiment D8b. The method of Embodiment D7, wherein the message is transmitted in system information.

Example Embodiment D9. The method of any one of Example Embodiments D7 to D8b, wherein the message comprises a parameter that indicates that the wireless device is to monitor for PEI and/or WUS in the at least one last cell used by the wireless device.

Example Embodiment D10. The method of Example Embodiment D7, wherein the message is associated with a registration or update procedure.

Example Embodiment D11. The method of Example Embodiment D7, wherein the message is a Radio Resource Control message such as, for example a RRCRelease message.

Example Embodiment D12. The method of any one of Example Embodiments D1 to D11, wherein the characteristic associated with the wireless device is associated with subscription information for/associated with the wireless device.

Example Embodiment D13. The method of any one of Example Embodiments D1 to D12, wherein the characteristic associated with the wireless device is associated with a context stored for the wireless device.

Example Embodiment D14. The method of Example Embodiment D13, wherein the context is received from a core network node in a message associated with core network-initiated paging.

Example Embodiment D15. The method of Example Embodiment D13, wherein the context is received from a Distributed Unit of a gNodeB node in a message associated with gNB-initiated paging.

Example Embodiment D16. The method of any one of Example Embodiments D1 to D15, wherein the at least one last cell used by the wireless device comprises a plurality of cells last used by the wireless device.

Example Embodiment D17. The method of any one of Example Embodiments D1 to D16, wherein the network node comprises a gNodeB (gNB).

Example Embodiment D18. A network node comprising processing circuitry configured to perform any of the methods of Example Embodiments D1 to D17.

Example Embodiment D19. A computer program comprising instructions which when executed on a computer perform any of the methods of Example Embodiments D1 to D17.

Example Embodiment D20. A computer program product comprising computer program, the computer program comprising instructions which when executed on a computer perform any of the methods of Example Embodiments D1 to D17.

Example Embodiment D21. A non-transitory computer readable medium storing instructions which when executed by a computer perform any of the methods of Example Embodiments D1 to D17.

GROUP E EXAMPLE EMBODIMENTS

Example Embodiment E1. A wireless device comprising: processing circuitry configured to perform any of the steps of any of the Group A and Group C Example Embodiments; and power supply circuitry configured to supply power to the wireless device.

Example Embodiment E2. A network node comprising: processing circuitry configured to perform any of the steps of any of the Group B and Group D Example Embodiments; and power supply circuitry configured to supply power to the wireless device.

Example Embodiment E3. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A and Group C Example Embodiments; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment E4. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of the Group B and Group D Example Embodiments.

Example Embodiment E5. The communication system of the pervious embodiment further including the network node.

Example Embodiment E6. The communication system of the previous 2 embodiments, further including the wireless device, wherein the wireless device is configured to communicate with the network node.

Example Embodiment E7. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment E8. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of the Group B and Group D Example Embodiments.

Example Embodiment E9. The method of the previous embodiment, further comprising, at the network node, transmitting the user data.

Example Embodiment E10. The method of the previous 2 embodiments, wherein the user data is provided at the host computer by executing a host application, the method further comprising, at the wireless device, executing a client application associated with the host application.

Example Embodiment E11. A wireless device configured to communicate with a network node, the wireless device comprising a radio interface and processing circuitry configured to performs the of the previous 3 embodiments.

Example Embodiment E12. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of the Group A and Group C Example Embodiments.

Example Embodiment E13. The communication system of the previous embodiment, wherein the cellular network further includes a network node configured to communicate with the wireless device.

Example Embodiment E14. The communication system of the previous 2 embodiments, wherein: the processing circuitry of the host computer is configured to execute a host application, thereby providing the user data; and the wireless device's processing circuitry is configured to execute a client application associated with the host application.

Example Embodiment E15. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of the Group A and Group C Example Embodiments.

Example Embodiment E16. The method of the previous embodiment, further comprising at the wireless device, receiving the user data from the network node.

Example Embodiment E17. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of the Group A and Group C Example Embodiments.

Example Embodiment E18. The communication system of the previous embodiment, further including the wireless device.

Example Embodiment E19. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment E20. The communication system of the previous 3 embodiments, wherein: the processing circuitry of the host computer is configured to execute a host application; and the wireless device's processing circuitry is configured to execute a client application associated with the host application, thereby providing the user data.

Example Embodiment E21. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment E22. A method implemented in a communication system including a host computer, a network node and a wireless device, the method comprising: at the host computer, receiving user data transmitted to the network node from the wireless device, wherein the wireless device performs any of the steps of any of the Group A and Group C Example Embodiments.

Example Embodiment E23. The method of the previous embodiment, further comprising, at the wireless device, providing the user data to the network node.

Example Embodiment E24. The method of the previous 2 embodiments, further comprising: at the wireless device, executing a client application, thereby providing the user data to be transmitted; and at the host computer, executing a host application associated with the client application.

Example Embodiment E25. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment E26. A communication system including a host computer comprising a communication interface configured to receive user data originating from a transmission from a wireless device to a network node, wherein the network node comprises a radio interface and processing circuitry, the network node's processing circuitry configured to perform any of the steps of any of the Group B and Group D Example Embodiments.

Example Embodiment E27. The communication system of the previous embodiment further including the network node.

Example Embodiment E28. The communication system of the previous 2 embodiments, further including the wireless device, wherein the wireless device is configured to communicate with the network node.

Example Embodiment E29. The communication system of the previous 3 embodiments, wherein: the processing circuitry of the host computer is configured to execute a host application; the wireless device is configured to execute a client application associated with the host application, thereby providing the user data to be received by the host computer.

Example Embodiment E30. A method implemented in a communication system including a host computer, a network node and a wireless device, the method comprising: at the host computer, receiving, from the base station, user data originating from a transmission which the network node has received from the wireless device, wherein the wireless device performs any of the steps of any of the Group A and Group C Example Embodiments.

Example Embodiment E31. The method of the previous embodiment, further comprising at the network node receiving the user data from the wireless device.

Example Embodiment E32. The method of the previous 2 embodiments, further comprising at the network node, initiating a transmission of the received user data to the host computer.

Example Embodiment E33. The method of any of the previous embodiments, wherein the network node comprises a base station.

Example Embodiment E34. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure.

The invention claimed is:

1. A method by a wireless device comprising:

receiving, from a network node, in system information for a cell, a message comprising an indication of whether the wireless device is to monitor for a Paging Early Indicator, PEI, for the wireless device in the cell only when the cell is a last cell used by the wireless device; and monitoring for the PEI in the cell based on the message, wherein, if the indication indicates that the wireless device is to monitor for the PEI in the cell only when the cell is the last cell used by the wireless device, the wireless device monitors for the PEI in the cell when the cell is the last cell used by the wireless device, and wherein, if the indication indicates that the wireless device is not to monitor for the PEI in the cell only when the cell is the last cell used by the wireless device, the wireless device monitors for the PEI in the cell when the cell is the last cell used by the wireless device and when the cell is not the last cell used by the wireless device.

2. The method of claim 1, wherein the indication comprises a Boolean type indication.

3. The method of claim 1, wherein the message comprises a parameter that indicates whether the wireless device is to monitor for PEI in the cell only when the cell is the last cell used by the wireless device.

4. The method of claim 1, wherein the message is a Radio Resource Control, RRC, message.

5. The method of claim 1, wherein the indication indicates that the wireless device is to monitor for the PEI in the cell only when the cell is the last cell used by the wireless device.

6. A wireless device comprising processing circuitry configured to:

receive, from a network node, in system information for a cell, a message comprising an indication of whether the wireless device is to monitor for a Paging Early Indicator, PEI, for the wireless device in the cell only when the cell is a last cell used by the wireless device; and monitoring for the PEI in the cell based on the message, wherein, if the indication indicates that the wireless device is to monitor for the PEI in the cell only when the cell is the last cell used by the wireless device, the wireless device monitors for the PEI in the cell when the cell is the last cell used by the wireless device, and wherein, if the indication indicates that the wireless device is not to monitor for the PEI in the cell only when the cell is the last cell used by the wireless device, the wireless device monitors for the PEI in the cell when the cell is the last cell used by the wireless device and when the cell is not the last cell used by the wireless device.

7. A method by a network node comprising:

transmitting, to a wireless device, in system information for a cell, a message comprising an indication of whether the wireless device is to monitor for a Paging Early Indicator, PEI, for the wireless device in the cell only when the cell is a last cell used by the wireless device; and transmitting the PEI in the cell based on the message, wherein, if the indication indicates that the wireless device is to monitor for the PEI in the cell only when the cell is the last cell used by the wireless device, the network node transmits, to the wireless device, the PEI in the cell when the cell is the last cell used by the wireless device; and wherein, if the indication indicates that the wireless device is not to monitor for the PEI in the cell only when the cell is the last cell used by the wireless device, the network node transmits, to the wireless device, the PEI in the cell when the cell is the last cell used by the wireless device and when the cell is not the last cell used by the wireless device.

8. The method of claim 7, wherein the message comprises an indicator of a Boolean type, the indicator indicating whether the wireless device is to monitor for PEI in the cell only when the cell is the last cell used by the wireless device.

9. The method of claim 7, wherein the message comprises a parameter that indicates whether the wireless device is to monitor for PEI in the cell only when the cell is the last cell used by the wireless device.

10. The method of claim 7, wherein the message is a Radio Resource Control, RRC, message.

11. The method of claim 7, wherein the network node comprises a gNodeB, gNB.

12. A network node comprising processing circuitry configured to perform a method comprising:

transmitting, to a wireless device, in system information for a cell, a message comprising an indication of whether the wireless device is to monitor for a Paging Early Indicator, PEI, for the wireless device in the cell only when the cell is the last cell used by the wireless device; and transmitting the PEI in the cell based on the message, wherein, if the indication indicates that the wireless device is to monitor for the PEI in the cell only when the cell is the last cell used by the wireless device, the network node transmits, to the wireless device, the PEI in the cell when the cell is the last cell used by the wireless device; and wherein, if the indication indicates that the wireless device is not to monitor for the PEI in the cell only when the cell is the last cell used by the wireless device, the network node transmits, to the wireless device, the PEI in the cell when the cell is the last cell used by the wireless device and when the cell is not the last cell used by the wireless device.

13. The network node of claim 12, wherein the message comprises an indicator of a Boolean type, the indicator indicating whether the wireless device is to monitor for PEI in the cell only when the cell is the last cell used by the wireless device.

14. The wireless device of claim 6, wherein at least one of:

the indication comprises a Boolean type indication, and the indication comprises a parameter that indicates whether the wireless device is to monitor for PEI in the cell only when the cell is the last cell used by the wireless device.

15. The wireless device of claim 6, wherein the message is a Radio Resource Control, RRC, message.

* * * * *